(No Model.)
J. D. TYNES.
NUT LOCK.
No. 517,370. Patented Mar. 27, 1894.
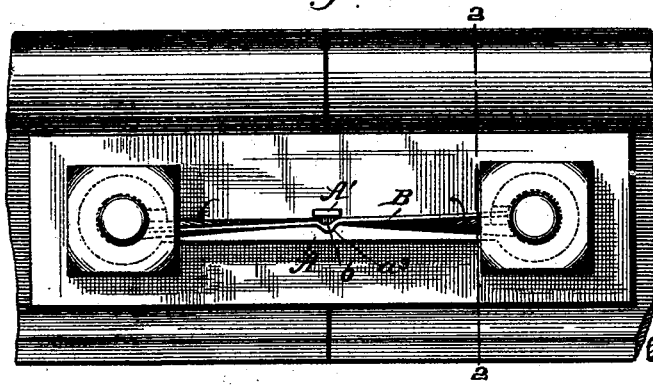
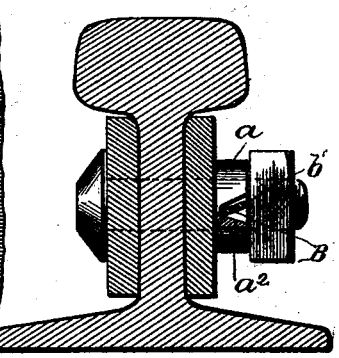
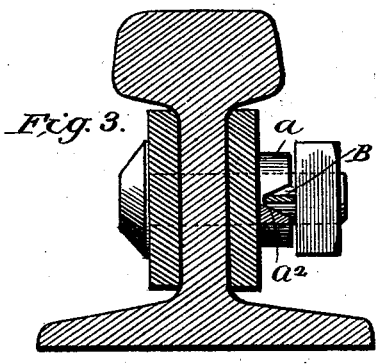
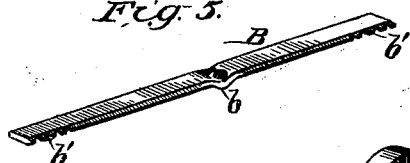
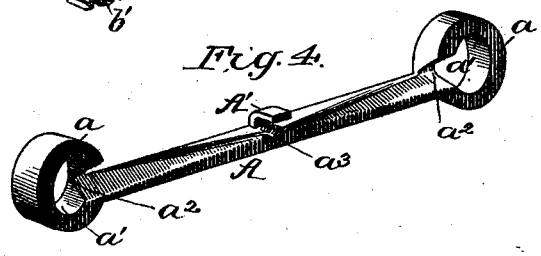
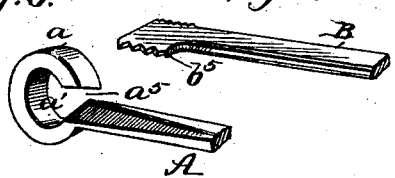
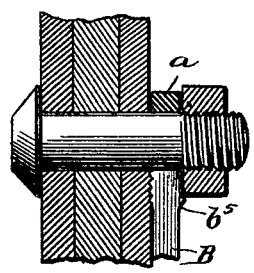
WITNESSES:
Fred G. Dieterich
Jos. A. Ryan
INVENTOR
J. D. Tynes.
BY Munn & Co
ATTORNEYS.
THE NATIONAL LITHOGRAPHING COMPANY,
WASHINGTON, D. C.

UNITED STATES PATENT OFFICE.

JEFFERSON D. TYNES, OF FORT SMITH, ARKANSAS.

NUT-LOCK.

SPECIFICATION forming part of Letters Patent No. 517,370, dated March 27, 1894.

Application filed July 29, 1893. Serial No. 481,845. (No model.)

*To all whom it may concern:*

Be it known that I, JEFFERSON D. TYNES, residing at Fort Smith, in the county of Sebastian and State of Arkansas, have invented certain new and useful Improvements in Nut-Locks, of which the following is a specification.

My invention has for its object to provide a simple and inexpensive nut lock, which can be easily manipulated and which will effectively serve for its desired purpose, and such invention consists in the peculiar arrangement and combination of parts such as will hereinafter be first described and then particularly pointed out in the claims, reference being had to the accompanying drawings in which—

Figure 1 is a front view of my improved nut lock as applied for use. Fig. 2 is a cross section taken on line 2—2 Fig. 1. Fig. 3 is a similar section, illustrating the position of the key before the nut is screwed tightly against the washer. Fig. 4 is a perspective view of the washer or main plate detached. Fig. 5 is a similar view of the key. Figs. 6 and 7 are detail perspective views of modified forms of the washer plate and key, and Fig. 8 is a horizontal section illustrating the modified construction as applied in use.

My improvement is in the nature of a double lock nut, especially designed to lock nuts against the fish plates of rail joints, and while I have not shown it, it will hereinafter be manifestly understood that it may be readily constructed and adapted for use with a single nut and bolt.

In the drawings, Figs. 1 to 4 inclusive, I have illustrated the preferred form, and in such construction it will be noticed, the same comprises a main plate or connecting bar A, the ends of which terminate in apertured circular portions which form washers $a$ $a$, the apertures $a'$ $a'$ of which communicate with $<$ shaped recesses $a^2$ cut in the outer face of the plate A, and extended nearly to the rear edge thereof. The connecting bar A, it will be noticed, has a central staple like overlapping member A', from which the upper face of the bar tapers outwardly and downwardly toward the washers $a$, terminates at their apertures, and forms as it were, the lower wall of the $<$ shape recesses, the central portion of such connecting bar being provided with a depression $a^3$, to receive the seat or lug portion $b$, on the key plate B. This key plate, which is in the nature of a stout steel bar, seats with its central portion in the staple like member on the center of bar A, and when in its normal or unlocked position it is held with its opposite ends in an approximately horizontal position, and such plate has its outer edge near its ends beveled and formed with serrations $b'$ $b'$, which normally project slightly beyond the face of washers $a$, while the rear edges of such ends seat in the apex of the $<$ grooves as most clearly shown in Fig. 3 of the drawings.

So far as described it will be noticed that when the nut is tightly screwed up against the washer, its inner face will engage the serrated edge of the key plate, twist it in the direction indicated by the arrow, and thereby make such end assume a position diagonal to the face of the nut as most clearly shown in Fig. 2 of the drawings. Now as the plate is thus twisted it becomes a torsion spring plate, the strain of which forces the serrated edge outward to bite against the nut and thereby cause it to securely bind on its screw bolt and hold it from turning, or working loose.

In Figs. 6, 7 and 8, I have shown a slightly modified construction of parts, by reference to which it will be seen, the $<$ shaped groove extends entirely through the lock bar as at $a^5$, and the end of the key plate has its rear edge slightly extended and serrated as at $b^5$, which edge engages the fish plate as most clearly shown in Fig. 8. In this construction, as the nut is screwed home against the washer, the rear end $b^5$ of the key plate will be forced against the fish plate, while its front edge will be turned up at an angle to the face of the nut, the torsional strain of such key plate causing the nut to bind with its threads tightly against the bolt threads.

From the foregoing description taken in connection with the drawings it will readily appear that as the key plate is twisted, when under pressure of the nut, the outer or cutting edge of the key plate is pressed hard up against the inner face of the nut, so that when said nut works, this edge cuts into the nut, ratchet fashion and prevents its outward movement.

Having thus described my invention, what I claim, and desire to secure by Letters Patent, is—

1. In a nut locking device, the combination with the rail, the bolt and nut, of a washer plate fitted against the rail, a spring metal bar fixedly held at one end on the washer plate, its free end projected normally at right angles to the face of the nut, and beyond the face of the washer plate, such end adapted to be twisted at an angle to the face of the nut as such nut is screwed home, whereby its retractile or torsional strain will force it into tight contact with the nut, all substantially as shown and described.

2. An improved nut locking device, comprising a base plate having apertured washer like ends, adapted to fit over the bolts, a spring metal key bar fixedly held at its center on the base plate, its opposite ends being held for a free twist movement, and projected beyond the face of the said washer portions of the base plate, all arranged substantially as shown and described.

3. An improved nut locking device comprising a base plate having apertured washer like portions at its ends, seat portions at the inner edges of such apertured ends, a spring metal key bar fixedly held at its center on the base plate, its free ends held in such seat portions with their front edges projected beyond the face of plate, whereby such ends are adapted to receive a twisted movement within the said seat portion as the nut is screwed home, all substantially as shown and for the purposes described.

4. In a nut locking device, the combination with the rail, the bolt and the nut, of a connecting bar or base plate having apertured washer like ends, the upper face of the connecting portion of such bar being tapered outwardly and downwardly from its center toward its ends, < shaped grooves formed in the face of such plate adjacent the bolt apertures, a spring metal key member held on the upper face of the connecting bar, its outer ends projected into the said < grooves, and the front edge beyond the face of the base plate, whereby it is adapted to be engaged by the nut as it is screwed home, all substantially as and for the purposes described.

5. As an improvement in nut locks, the combination with the rail sections, the fish plates and the bolts and nuts, of the plate A, formed with apertured washer like ends $a$ adapted to fit over the bolts, and with angular grooves at the inner edges of the apertures in such ends $a$ said grooves extended through such base plate, and the key bar B fixedly held centrally on the bar A, its ends projected into the grooves, such ends having laterally extended contact portions, extended beyond the front and rear faces of the base plate A, whereby the rear edges of such key will be forced against the fish plate, and the front edges twisted up at an angle to the nuts as such nuts are screwed home on the bolt all substantially as and for the purposes described.

JEFFERSON D. TYNES.

Witnesses:
J. R. GANT,
E. E. PAYNE.